July 30, 1968  C. CHOZIANIN ET AL  3,395,020
MANUFACTURE OF CHOCOLATE PRODUCTS
Filed April 21, 1964  2 Sheets-Sheet 2
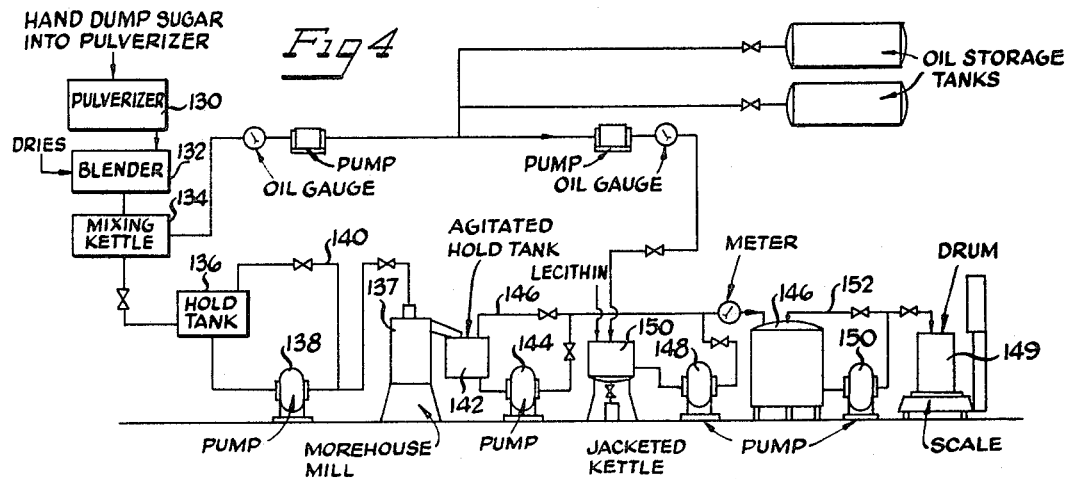
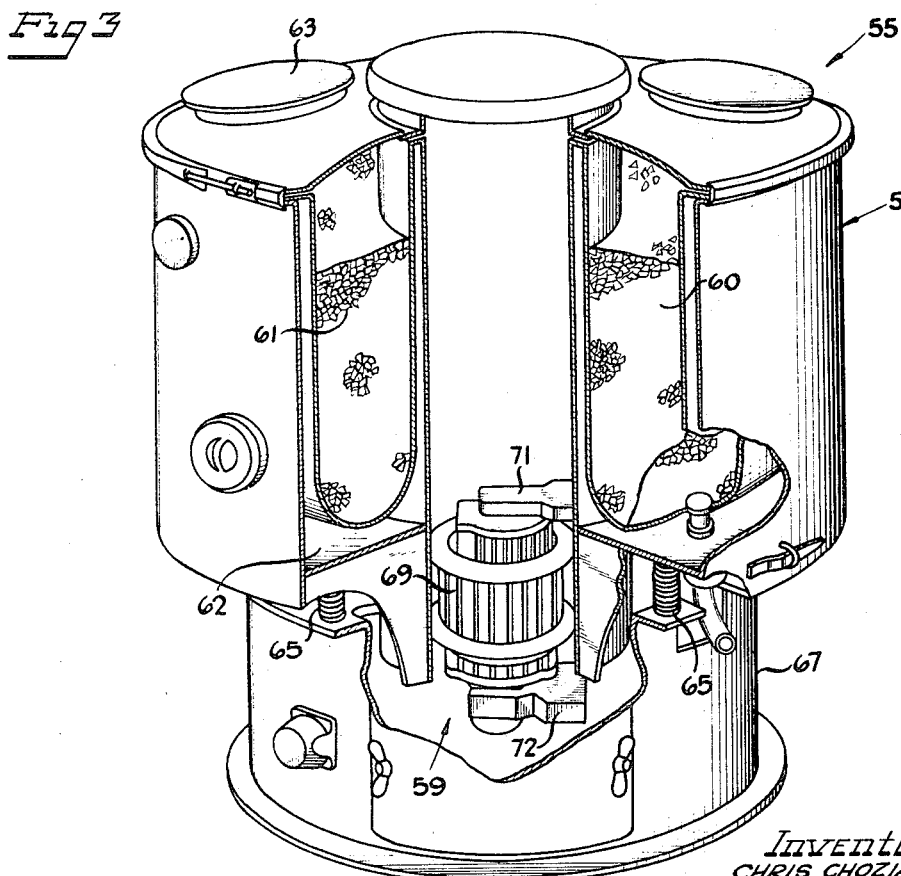
Inventors
CHRIS CHOZIANIN
LARS H. WIEDERMANN United States Patent Office 3,395,020
Patented July 30, 1968

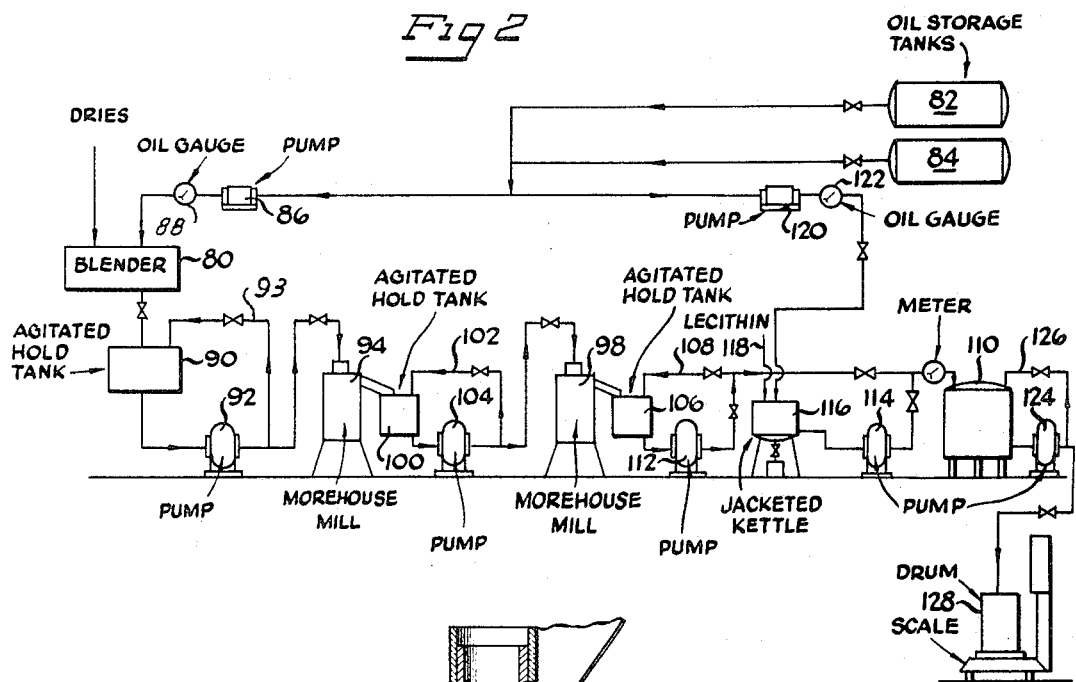
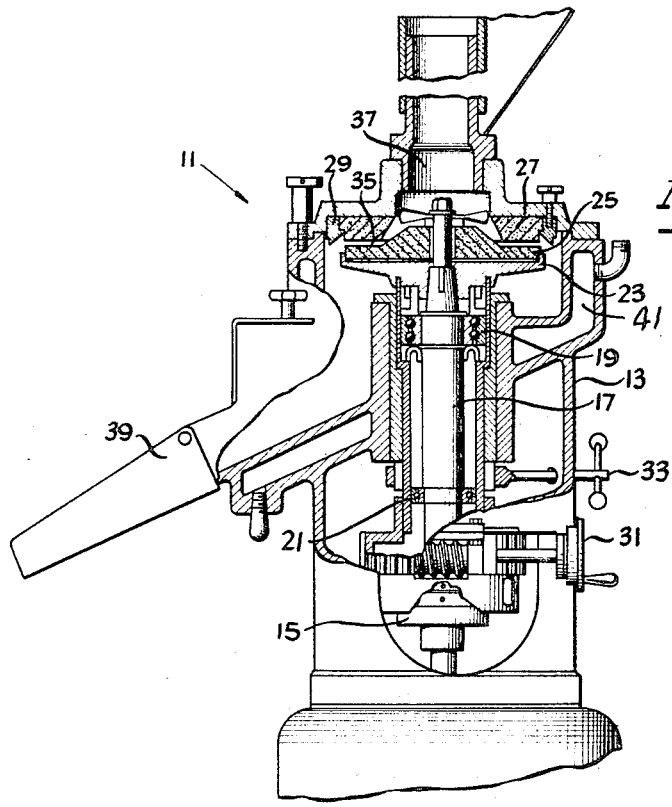

3,395,020
MANUFACTURE OF CHOCOLATE PRODUCTS
Chris Chozianin, Morton Grove, and Lars H. Wiedermann, Des Plaines, Ill., assignors to National Dairy Products Corporation, New York, N.Y., a corporation of Delaware
Filed Apr. 21, 1964, Ser. No. 361,511
1 Claim. (Cl. 99—23)

ABSTRACT OF THE DISCLOSURE

A process for producing finished chocolate, which may be a sweet chocolate or milk chocolate. In the process, a chocolate mixture of cocoa powder or chocolate liquor, cocoa butter or other edible oil, and sugar or other sweetening agent, is milled through a high-shear milling machine wherein the mixture is heated during the milling step to a temperature of at least 160° F., whereby a characteristic chocolate flavor is obtained. Prior to or after the high-shear milling step the finished chocolate product may be subjected to a further milling step to reduce the particle size of individual components to less than 25 microns.

---

The present invention relates generally to chocolate products. More particularly, it relates to an improved method for the manufacture of such products.

In accordance with conventional manufacture of chocolate confectionery products, cocoa beans are cleaned, graded, and roasted. After roasting, the beans are cracked and cocoa nibs or seeds are separated from the husks or shells and the foreign matter.

Selected kinds of cocoa nibs are weighed and blended to provide the type and intensity of flavor desired for the desired chocolate product.

The blended nibs are thereafter ground in mills, such as stone disk mills and steel roll refiners, to provide the chocolate liquor of commerce. Chocolate liquor may itself be utilized to subsequently provide a chocolate confectionery or other product, or, alternatively, the liquor may be pressed using special filter presses to separate it into cocoa butter and a cake comprising cocoa fibers. The cake may be cooled, pulverized and sifted to provide cocoa powder, which may thereafter be incorporated into cocoa butter or other edible oils in the manufacture of chocolate products.

If the chocolate liquor itself is to be utilized to make sweet chocolate, it is usually mixed with powdered sugar and additional cocoa butter, or other edible oil. To produce a milk chocolate, milk powder or sweetened evaporated milk is also added. If the moisture content of the resultant mixture is too high, the mixture may be subjected to vacuum drying to reduce its moisture content.

The desired mixture is thereafter usually refined by passing it through one or more roll refiners. A roll refiner comprises a plurality of counter-rotating, parallel, steel rolls through which the chocolate mixture is fed. The rolls are rotatably supported in closely adjacent relationship, so that the mixture is subjected to intense shearing action as it passes into the nip of the rolls. Roll refiners having five parallel rolls are commonplace in the industry.

A roll refiner is a relatively costly piece of equipment, and substantial experience and skill is required to properly operate it. For example, successive nips of the roll refiner should be progressively smaller so that, as the size of the solid particles in the chocolate mixture is reduced, the particles are nevertheless subjected to substantially the same shearing stress. In addition, the rolls of a roll refiner are usually water cooled so that thermal expansion of the rolls does not result in an uneven nip along the length of the roll. The roll bearings must be well lubricated and maintained to retain proper operating efficiency.

If cocoa powder is utilized in the manufacture of the chocolate product, the powder is mixed with an edible oil, such as coconut oil or cocoa butter, and with powdered sugar. This mixture is then refined in a roll refiner in the same manner as when chocolate liquor is utilized.

The refined product made from either chocolate liquor or cocoa powder may be used as such in various chocolate products, without further treatment thereof. For example, coatings of frozen confections and similar chocolate confectionery products usually include such products.

In order to develop a second flavor and bouquet in the chocolate product, the refined chocolate mixture is often further treated. In this connection, the next apparatus generally used is a conch, a machine which comprises a heated pot having a granite bed and a granite roller supported on the bed of the pot which roller reciprocates along the length of the bed. The refined chocolate mixture may be treated in the conch for periods as long as 100 hours, at a temperature of 160 degrees F. to 170 degrees F., to provide a smooth and viscosity-stable paste. Higher temperatures may be used in the case of milk chocolate.

Because of the relatively high initial cost of apparatus which has heretofore been utilized in the size reduction of particles in chocolate mixtures and in the development of the chocolate flavor therein, and because of the substantial maintenance and operating costs associated therewith, it is desirable to provide a simple and less costly method for accomplishing substantially similar results.

Accordingly, it is a principal object of the present invention to provide an improved method for the manufacture of chocolate products. A more particular object of the present invention is to provide improved methods for effecting particle size reduction and flavor development in chocolate products. Other objects and advantages of the present invention will become apparent from the following description, claim and drawings in which:

FIGURE 1 is a cross-sectional view of a selected embodiment of a mill utilized in the process of the invention;

FIGURE 2 is a flow sheet of a particular process embodying various features of the present invention;

FIGURE 3 is a perspective view, partly broken away, of a second mill utilized in the process of the invention; and FIGURE 4 is a second flow sheet of another process embodying various features of the present invention.

It has been found that high quality chocolate products can now be produced without the use of a roll refining mill. By employing certain apparatus to carry out successive milling steps, instead of a roll refining mill, high quality chocolate products can be produced from either chocolate liquor or cocoa powder.

It has been found that the function formerly carried out by the roll refining mill, i.e., reducing the size of the particles to a size which cannot be detected in the mouth while simultaneously working the product under conditions that serve to bring out the desired chocolate flavor, can be better performed by two separate treating steps. In the improved method of the invention, the ingredients are treated in a mill which subjects them to high shearing forces and in a second mill which is effective in reducing the size of particles while subjecting them to low shearing forces. Furthermore, it is considerably more economical to acquire and operate two separate apparatus of these types than one roll refining mill.

The process provided by the present invention is not limited to the production of a chocolate product from any specific starting ingredients, but may be used with any ingredients normally employed, e.g., cocoa powder, chocolate liquor, etc. Likewise, the process is not limited to the production of any specific type of chocolate product, but it is useful for the production of a variety of chocolate food products, such as chocolate coatings, sweet chocolates, milk chocolates, etc.

As previously stated, it is known that cocoa must be treated or worked in a particular manner in order to develop the desired flavor which has become characteristic of chocolate. It is probable that this working continues the denaturization of the chocolate proteins which has been partially accomplished during the preliminary roasting process. It is believed that this denaturization takes place in a roll refiner as a result of the localized heat and physically abusive action that occurs in the nips between adjacent rolls. However, it has been determined that heat alone, even with rapid cooling, will not produce this desired change which is stable. Testing has established that the desired flavor which rapid heat followed by rapid cooling provides lasts only for a week or two and then off-flavors begin to develop.

It has been found that by subjecting a mixture of cocoa fibers, obtained, for example, from cocoa beans or chocolate liquor, and an edible oil to intensive shearing in a suitable mill, a desired flavor and bouquet, at least comparable to that obtained by the roll refining process, is produced. Mills which provide high shearing force are suitable for carrying out this step of the process. Stone mills which are readily available and can be easily cleaned and maintained are preferable.

Shearing mills, which produce the necessary high temperature working to develop the desired flavor and bouquet, may also be used to preliminarily reduce the particle size. Depending upon the particular starting ingredients, it may be desirable to pass the product more than once through the mill or to use more than one mill. For example, if granulated sugar having a relatively large particle size, approximating 450 microns, is used, it is economical to use two mills in series. The two mills are set differently to most efficiently handle particles of a certain size, and the second stage mill will have a closer stone setting to treat the discharged materials from the first mill which has been partially reduced in particle size.

One suitable type of high shearing mill is the Morehouse-Cowles stone mill. One model Morehouse mill 11 is illustrated in FIGURE 1. This mill comprises an outer frame 13 and has a motor (not shown) mounted in the bottom portion of this frame. The motor is connected by a flexible coupling 15 to a drive spindle or shaft 17 which is mounted in an upper bearing 19 and a lower bearing 21. A rotor plate 23 is fixedly attached to the upper end of the spindle 17 and serves to mount a lower stone 25 for rotatable movement therewith. A matching upper stone 27 is mounted above the lower stone 25 in cooperating arrangement with it. The upper stone 27 is held in place by a suitable clamping ring 29. An adjustment wheel 31 permits the accurate setting of the clearance between the two stones, and an adjustable locking handle 33 allows the stone setting to be locked after proper adjustment has been made.

The space between the pair of stones provides a grinding cavity 35. An inlet or feed channel 37 communicates with the grinding cavity 35, and a lower discharge spout 39 on one side of the mill 11 directs the discharge of the material therefrom at the completion of the grinding. An outer hollow jacket 41 is provided which can be used to cool or heat the mill 11 as the case may warrant.

The mill 11 is suitable for grinding ingredients for food products and has found wide use in the food industry. The grinding is produced by the high shear forces generated between the rotating lower stone 25 and the stationary upper stone 27. These shear forces develop the flavor and bouquet desired in a chocolate product.

In this connection, the desired flavor and bouquet is obtained by controlled regulation of the amount of shear energy imparted to the chocolate ingredients. It has been found that the ingredients should be subjected to sufficient shear energy to cause a rise in temperature to between about 160° F. and about 190° F. at the point of discharge from the mill 11.

The other step, reducing the particles of the ingredients to a size which is undetectable in the mouth, may be carried out either before or after the flavor development step. Preferably, the flavor development step is carried out first because of practical economic considerations. This preferred sequence takes advantage of the size reduction of the particles which, incidentally, occurs during the flavor development in the shearing mill, thus reducing the over-all amount of particle reduction which is necessary in the size-reducing mill.

Apparatus which is adapted to reduce the ingredients to a fine particle size can be used in the performance of this step. Preferably, apparatus is employed which does not employ substantial use of shear force to effect size reduction. A high frequency vibrating mill, such as the mill marketed under the name "Sweco" mill by the Southwestern Engineering Company, is most preferred.

The Sweco mill performs the grinding or size reduction operation by high frequency impacts of one grinding unit against another. This operation proves extremely effective in reducing the particle size of a wet mixture or of a slurry to a uniformly small size. Size reductions to a size of a few microns can be carried out in equipment of this type. For the purposes of the present invention, reduction to a size less than about 25 microns is considered satisfactory. Only particles slightly larger than 25 microns can be detected in the mouth. Preferably, the particle size of a chocolate product is reduced to a size from about 15 to 17 microns.

An example of a Sweco wet grinding vibro-energy mill 55 is generally illustrated in FIGURE 3. The Sweco mill 55 includes a grinding chamber 57 and a vibrating mechanism 59. The grinding chamber 57 includes a compartment 60 in the form of a vertical annulus which is filled with small pieces of a very hard grinding media 61, such as sintered aluminum oxide. The grinding media 61 may be of various shapes, cylindrically shaped pieces having proved especially effective. The grinding chamber 57 also includes a compartment 62 which surrounds the grinding compartment 60 and provides passage for a cooled or heated liquid to allow regulation of the operating temperature.

The wet material to be ground is introduced into the spaces between the grinding media 61 by pouring it through an upper charge opening 63. The vibrating mechanism 59 is attached directly to the lower portion of the grinding chamber 57, and the composite assembly is suspended on high tensile steel springs 65 on a base 67. Hence, all the energy from the vibrating mechanism 59 is imparted directly to the grinding media 61 without the necessity of intermediate linkages.

The vibrating mechanism 59 includes an electric motor 69 having a heavy shaft mounted in heavy-duty roller bearings. At each end of the shaft there are attached eccentrically mounted weights 71, 72. The upper weight 71 lies in the same horizontal plane as the top of the suspension springs 65 and is fixedly connected to the motor shaft. The lower weight 72 is adjustably pivotable so that the angle which it forms, relative to the upper weight 71, can be varied.

The upper eccentric weight 71 causes a horizontal gyration of the grinding chamber 57 while the lower eccentric weight 72 provides a gyrating tilt. This motion causes three dimensional, high frequency, vibration, which constitutes the transfer agent that converts the motive energy into grinding impact.

The vibration shock is transmitted from the sides and the base of the compartment 60 to the grinding media 61. High frequency shock waves travel through the grinding media 61 from piece to piece, across the distance from the outer to the inner surfaces of the annulus and back again. Particle size reductions meanwhile occur as a result of the high frequency impacts of one piece of grinding media 61 against another, which impacts break the particles held in suspension between the surfaces or points of impact of the media 61.

At the same time, each individual piece of grinding media 61 slowly rotates against the others. This rotation aids the dispersion of the agglomerates and assures uniformity of particle size reduction.

The contamination of materials being ground is, of course, an important factor in feed operations. Because of the rapid wear of the grinding media in mills, such as ball or pebble mills, these mills have some disadvantages for an operation such as this. The amount of contaminant from the extremely hard alumina cylinders, preferably used with the Sweco mill has been tested for in the final product and found to be negligible.

The Sweco mill also exhibits other advantages which are desirable for this operation. One of these advantages is that the product being treated may be discharged from the mill while the motor is running. Thus, a product may be recycled without halting the grinding operation. The mill can be easily cleaned by adding a detergent-water solution and energizing the mill following with hot flushing. This procedure eliminates substantially all traces of the product milled in the Sweco mill and thus readies it for use with a product of different composition.

Although there is some small amount of product entrainment upon the grinding media, so long as the mill is being used to produce one product, this factor does not cause difficulties. At any time it is desired to change the type of product being milled, the remaining entrained product can be easily recovered by adding additional solvent at the top of the mill.

The process of the present invention is generally a batch operation. The time it takes to produce one batch is generally determined by the size reducing mill because the high-shear mills are usually able to produce a pre-mix product faster than the size reducing mill can operate. It has been found that a Sweco mill suitable for handling a batch of about 1200 pounds of chocolate product which is fed to the Sweco mill with a particle size of about 40–50 microns, can reduce the particle size to the desired size, i.e., 15 to 17 microns, in a time period of about 15 minutes. This time, plus an additional 5 minutes to fill and discharge the product from the mill, gives an overall rate of production of about 60 pounds per minute. This rate is considerably faster than the rate at which an equivalent product can be processed on a single 5-roll refiner mill.

Generally, the ingredients used in the improved process may be any of those normally used with the roll-refining process. For example, a suitable milk chocolate confectionery coating can be produced using cocoa, such as Nestle's Paramount cocoa, sugar, non-fat dry milk solids, an edible oil, such as coconut oil, and ethyl vanillin as a beginning feed composition. Usually the dry ingredients will first be mixed, and then the edible oil blended with the dry mixture. The mixing and blending may be carried out in well known manners.

The starting material is not restricted to cocoa, but other suitable materials, such as chocolate liquor, may also be used. Likewise, various of the edible oils, or blends of these oils well known in the art may be used that are suitable for such an application. Generally, however, coconut oil and cocoa butter are most often used. Usually only about one-third of the total amount of the total oil which goes into the formulation is blended at this point. The remainder is added after the flavor development has taken place.

The starting composition is first treated by the high-shearing mill wherein the chocolate flavor is developed and the particle size is initially reduced. The product discharged from this step is transferred to the size-reducing mill where additional edible oil and some lecithin is added. The final treatment takes place in this mill wherein the particle size is reduced to the point where they are undetectable in the mouth, usually about 15 to 17 microns in size. The product discharged from this mill is complete and can be packaged and marketed without further processing.

Chocolate products produced by this process have a desirable "burnt" chocolate, carmelized sugar flavor which is at least equal to a comparable product made by the standard roll-refining process. In many instances, the flavor has been adjudged superior. Preliminary results indicate that the improved process reduces the conching requirements necessary to develop the bouquet characteristics of very high quality chocolate.

The described method provides a significant advantage in operation over the roll mill because of the greater rate of production. However, there is additional advantage because the total cost of the two mills required, e.g., a Morehouse stone mill and a Sweco mill, is considerably less than the cost of a roll refiner mill of comparable size. Additionally, there is the further advantage that mills of these types provide far more trouble-free operation, thus requiring less maintenance and less expert operation than does a 5-roll refiner mill.

The following examples are provided to illustrate specific processes embodying various of the features of the invention which more clearly describe certain steps thereof, but these examples are in now way intended to limit or otherwise restrict the scope of the invention.

Example I

A process for the production of a milk chocolate confectionery coating is illustrated by the flow diagram entitled FIGURE 2. The following quantities of dry materials are scaled into a blender 80: 379 pounds granulated sugar, 200 pounds of cocoa, 69 pounds non-fat dry milk solids and 0.67 pound of ethyl vanillin. These ingredients are mixed with 331 pounds of 76 degree coconut oil, about one-third the total oil in the finished coating, which is metered into the blender 80 from oil tanks 82 and 84 by means of a pump 86. An oil gauge 88 is provided for measuring purposes.

After thorough mixing has taken place in the blender 80, the blend is transferred to a hold tank 90 which is provided with an agitator. The blend is maintained in the hold tank 90 as feed-stock for the high-shearing grinding step necessary for flavor development. Separation of the phases at this point is prevented by constant recirculation through a pump 92 which can recirculate the product through line 93 and which feeds the blend to two 8-inch Morehouse mills 94 and 98 arranged in series and equipped with No. R–536 stones. These mills are of the type generally shown in FIGURE 1.

The first mill 94 is set so as to reduce the particle size of the ingredients from their entry size to a maximum size of about 140 microns. The exit temperature of the ingredients from the mill is used to control the setting of the stones. The temperature is maintained between about 130 degrees F. and 150 degrees F. From this mill the ingredients pass into another hold tank 100 which is also provided with agitation. The output of the hold tank 100 can either be recirculated through line 102 or be pumped to the second Morehouse mill 98 by means of pump 104. The second mill 98 is set to reduce the particle size of the ingredients to a maximum of about 40–50 microns. The exit temperature of this mill is maintained at about 180–190° F. Both mills are operated at a throughput of about 50 pounds per minute.

As previously pointed out, the temperature at which the mixture is discharged from the second mill 98 is important in obtaining a desired flavor and bouquet in the chocolate product. In the present example, the inlet temperature to the mill 98 is 130–150° F., and the outlet temperature is 180–190° F., corresponding to a temperature rise of 30–60° F.

The discharge from the second mill 98, which is referred to as pre-mix material, is fed into another hold tank 106 provided with agitation. From this tank, the size reduced material is recirculated through line 108 or pumped to a size reducing mill 110, such as a model M–60 Sweco mill, having a 70 gallon working capacity. This mill is generally similar to the unit shown in FIGURE 3. A pump 112 is used for these purposes. At this point, additional 76 degree coconut oil and a small amount of lecithin are added as a blend in the following ratios: 300 pounds of material, 200 pounds 76 degree coconut oil and 1.25 pounds of lecithin. The oil blend is added by a volumetric pump 114 from a jacketed kettle 116. The jacketed kettle 116 receives lecithin through line 118 and oil from tanks 82 and 84 through pump 120 and oil gauge 122.

After the materials have been added to the mill 110, the mill is operated for 15 minutes, with product recycling through a pump 124 and line 126 at a rate of about 50 gallons per minute to facilitate mixing and minimize grinding time. The offset weight arrangement of the mill 110 is set at zero degrees, and water at about 90° F. is circulated through the jacket of the mill to assure proper product consistency. At the end of the 15 minute period, the valve arrangement is set so that the re-cycling pump fills the appropriate drums 128 with the finished product.

By micrometer measurement, the particle size of the finished product is found to be about 10 to 12.5 microns. The finished product has a desirable chocolate flavor, a smooth uniform milk chocolate appearance throughout, and is devoid of dark specks of chocolate. The product is considered well-suited for use as a confectionery coating.

Example II

Another process for the production of chocolate product is illustrated by the flow diagram indicated as FIGURE 4. Granulated sugar is reduced to 6X size in a pulverizer 130 and transferred to a ribbon blender 132. The dry ingredients or dries are added to the blender 132 in accordance with the following formula: 170 pounds sugar, 98 pounds of cocoa, 31 pounds of non-fat dry milk solids and 0.3 pound of ethyl vanillin. After thorough blending has taken place, 399 pounds of the dries and 198 pounds of coconut oil are mixed in an agitated, jacketed mixing kettle 134 fitted with breaker bars. The jacket-water temperature of the kettle 134 is maintained at about 105 degrees F. to maintain the fat portion of the blend fluid.

When mixing is completed, the resulting blend is transferred to a hold tank 136 provided with agitation whence it is fed to a 5-inch Morehouse mill 137 of the type shown in FIGURE 1, equipped with No. R–536 stones for the flavor development step. A pump 138 is used for this purpose, but the pump may also be used to recirculate the blend through line 140 into the hold tank 136. The mill is operated at a feed rate of about 7.5 pounds per minute and an exit temperature of about 185 degrees F. At this rate, the batch formulated in the mixing kettle is fed through the mill 137 in about 80 minutes. The mixture at this rate, is treated in the mill for about 2 seconds. It is discharged at a particle size of about 50 microns into a hold tank 142 provided with agitation. The product from the mill 137 requires only gentle agitation to prevent phase separation. However, the product can be recirculated through pump 144 and line 146 into the tank 142.

The material is pumped from tank 142 to a size reducing mill 146 which is operated as described in connection with mill 110 in Example I. A blend of coconut oil and lecithin is prepared and added to the product by means of a pump 148 which receives the blend from a jacketed kettle 150. The following weight ratio of components is pumped to the mill 146: 59.75 parts of product, 40 parts of 76 degree coconut oil and 0.25 part of lecithin. After about 15 minutes, the size reduction is complete, and the valve arrangement is set so that the pump fills the waiting drums 149 with the finished product. Recirculation for the mill 146 is provided by pump 150 and line 152.

The particle size of the finished product is about 10 to 12.5 microns. The product has a desirable chocolate flavor and a smooth, uniform appearance throughout. A visual inspection of the product shows that it is devoid of dark specks of chocolate. It is considered well-suited as a milk chocolate confectionery coating.

Example III

The procedure set forth in Example II is repeated using a blend of chocolate liquor and cocoa instead of cocoa alone.

The following ingredients are blended in the ribbon blendor 132 in the following ratio: 180 pounds 6X sugar, 33 pounds cocoa, 31 pounds non-fat dry milk solids, and 0.25 pound ethyl vanillin. These blended dries are mixed with chocolate liquor and coconut oil in the kettle 134 to provide the feed for the mill 137. The following amount of materials are used for one batch: 400 pounds blended dries, 70 pounds chocolate liquor and 160 pounds 76 degree coconut oil.

The resultant product has a particle size of about 10 to 12.5 microns and is completely free of dark specks. The product has a desirable chocolate flavor, similar to the flavor of the product from Example II, and is of smooth uniform appearance throughout. It is considered well-suited as a milk chocolate coating. The product is stored for a one-month period at about 72 degrees F. At the end of this period, it is tested and found to have suffered no deterioration in flavor.

Example IV

A milk chocolate product is produced using the same general operation described in Example II. A dry blend is produced by blending 500 pounds of 6X sugar with 135 pounds of dry, whole milk powder. The dry blend is mixed with chocolate liquor and cocoa powder in the following amounts: 635 pounds blended dries, 105 pounds chocolate liquor and 150 pounds cocoa butter.

The feed rate to the mill 94 is increased to 8.5 pounds per minute and an exit temperature of about 150 degrees F. is maintained. The following feed ratio to the mill 110 is utilized: 445 pounds of product, 55 pounds of cocoa butter and 0.1 pound of lecithin. The mill 110 is operated as described in Example I for about 15 minutes.

The finished product is devoid of dark specks of chocolate and has a particle size of about 10 to 12.5 microns. The product has a desirable rich, milk chocolate flavor and has a smooth, light chocolate appearance throughout. It is considered to be well-suited for use as a milk chocolate product.

Example V

A dark chocolate product is produced using the procedure set forth in Example I, substituting the amounts of ingredients hereinafter set forth. The feed for the first mill 94 is provided by mixing 450 pounds of granulated sugar, 400 pounds chocolate liquor and 50 pounds cocoa butter in the blender 80.

The product produced by the second mill 98 is mixed with cocoa butter and lecithin in the following amounts and fed into the mill 110: 450 pounds of product, 50 pounds of cocoa butter, 0.15 pound of lecithin.

The finished product is devoid of specks of chocolate and has a particle size of about 10 to 12.5 microns. The product has a desirable chocolate flavor and a uniformly dark, smooth appearance throughout. It is considered well-suited for use as a dark chocolate product.

The product is stored for a one-month period at about 72 degrees F. At the end of this period, it is tested and found to have suffered no deterioration in flavor.

The invention provides an improved process for the manufacture of chocolate products that has value to the chocolate industry. The process is revoluntary, compared to previous processes known in the art, and results in a substantial savings in operating time, labor, initial machinery investment cost and machinery maintenance.

Various of the features of the invention are set forth in the following claim.

What is claimed is:

1. An improved process for the manufacture of compounded chocolate coatings having a fully developed characteristic chocolate flavor consisting essentially of providing a fluid raw material mixture including cocoa fiber, a sweetening agent, and an edible oil, milling the raw material mixture for a period of less than about 30 seconds under shearing conditions, controlling said milling so that the temperature of the milled mixture is at least about 160° F. and thereafter further milling said mixture under nonshearing, high frequency, vibrating conditions to effect particle size reduction of the mixture to a maximum particle size of less than about 25 microns, said non-shearing milling step being effected in less than about one hour, whereby a chocolate product having a fully developed characteristic chocolate flavor is provided.

References Cited

UNITED STATES PATENTS

| 2,212,544 | 8/1940 | Lund | 99—23 |
| 2,889,225 | 6/1959 | Palik | 99—23 |

OTHER REFERENCES

Williams, C. T.: Chocolate and Confectionery. Leonard Hill Limited, London, 9 Eden St., NW. 1956 (pp. 86–92).

Cook, R. L.: Chocolate Production and Use, Catalog and Book Division, 1963, TP 640 C6 C.2 (pp. 156–159).

ALVIN E. TANENHOLTZ, *Primary Examiner.*

D. M. NAFF, *Assistant Examiner.*